US008736892B2

(12) United States Patent
Kubo et al.

(10) Patent No.: US 8,736,892 B2
(45) Date of Patent: May 27, 2014

(54) IMAGE FORMING APPARATUS FOR DETECTING ERROR AND TRANSFORMING PRINT DATA INTO ANOTHER TRANSFORMATION DATA

(75) Inventors: Naohiko Kubo, Kanagawa (JP); Yasuyuki Igarashi, Kanagawa (JP); Kohji Yamamoto, Kanagawa (JP); Daisuke Masui, Kanagawa (JP); Yuka Saito, Tokyo (JP); Yusuke Kudo, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 154 days.

(21) Appl. No.: 13/137,685

(22) Filed: Sep. 2, 2011

(65) Prior Publication Data

US 2012/0069356 A1 Mar. 22, 2012

(30) Foreign Application Priority Data

Sep. 16, 2010 (JP) ................................. 2010-208407

(51) Int. Cl.
*G06K 15/02* (2006.01)
(52) U.S. Cl.
USPC .......................................... 358/1.2; 358/1.15
(58) Field of Classification Search
USPC .......................................... 358/1.12, 1.15, 1.2
See application file for complete search history.

(56) References Cited

U.S. PATENT DOCUMENTS

| 5,028,042 | A | * | 7/1991 | Yamada et al. | .............. 271/9.06 |
| 7,656,548 | B2 | * | 2/2010 | Hagiwara | .................... 358/1.15 |
| 7,894,085 | B2 | | 2/2011 | Maeda | |
| 2002/0051219 | A1 | * | 5/2002 | Kurita et al. | .................. 358/400 |
| 2007/0097399 | A1 | * | 5/2007 | Boyd et al. | ..................... 358/1.13 |
| 2009/0046316 | A1 | | 2/2009 | Morohashi et al. | |

FOREIGN PATENT DOCUMENTS

| CN | 1946131 | | 4/2007 |
| CN | 101004666 | | 7/2007 |
| JP | 2004-288032 | A | 10/2004 |
| JP | 2009-037409 | A | 2/2009 |
| JP | 2009-048253 | * | 3/2009 |

OTHER PUBLICATIONS

Machine translation for JP2009-048253.*
Chinese Office Action for corresponding Chinese Application No. 201110276581.8 dated Nov. 1, 2013 along with its English language translation.

* cited by examiner

*Primary Examiner* — Qian Yang
(74) *Attorney, Agent, or Firm* — Harness, Dickey & Pierce, P.L.C.

(57) ABSTRACT

An image forming apparatus includes: a storage unit that stores print data and transformation data transformed into a printable format by reflecting a print condition on the print data; a detection unit that detects an error when the transformation data stored in the storage unit is printed; a decision unit that decides a resolution print condition which is a print condition for resolving an error based on a content of the error and a device state when the error is detected; a transformation unit that acquires the print data from the storage unit and transforms the acquired print data into transformation data on which the decided resolution print condition is reflected; and a print control unit that prints the transformation data transformed by the transformation unit.

10 Claims, 10 Drawing Sheets

FIG.9

| PRINT SHEET NUMBER LIMITATION OF EACH USER | | | | | |
|---|---|---|---|---|---|
| USER NAME | COLOR AUTHORITY | LIMIT SHEET NUMBER PER MONTH | | WARNING THRESHOLD VALUE | NUMBER OF PRINTED SHEETS |
| YAMADA | FULL COLOR | 1000 | | 80% OF LIMIT SHEET NUMBER | 586 |
| TANAKA | MONO-CHROME | 5000 | | 60% OF LIMIT SHEET NUMBER | 3888 |
| SUZUKI | MONO-CHROME | 10000 | | 95% OF LIMIT SHEET NUMBER | 9650 |

IMAGE FORMING APPARATUS FOR DETECTING ERROR AND TRANSFORMING PRINT DATA INTO ANOTHER TRANSFORMATION DATA

CROSS-REFERENCE TO RELATED APPLICATIONS

The present application claims priority to and incorporates by reference the entire contents of Japanese Patent Application No. 2010-208407 filed in Japan on Sep. 16, 2010.

BACKGROUND OF THE INVENTION

1. Field of the Invention

The present invention relates to an image forming apparatus, an image forming method, and a computer program product.

2. Description of the Related Art

In recent years, there has been known a technique of reflecting a print condition on print data described in a language such as a page description language (PDL) and transforming the print data into transformation data transformed into a printable format through a raster image processor (RIP). Further, in the past, there has been developed a method of performing a printing process at a high speed at the time of reprinting using transformation data transformed by the RIP.

For example, there has been disclosed a method of managing a print data entity in association with the content of a past print request so as to efficiently perform printing when a user accumulates print data which has been printed and then the print data accumulated by the user is reprinted or when print data accumulated by another user is printed (for example, see Japanese Patent Application Laid-open No. 2009-037409).

However, in the method disclosed in Japanese Patent Application Laid-open No. 2009-037409, it has been difficult to reflect a condition, which has influence on printing, changed from the time of accumulation when an accumulated document is printed. For example, when transformation data of a transmitted job has been an A4 size but a tray has A3 paper only, or has run out of paper during printing, since it has been difficult to change a print condition during printing, it has been difficult to continue printing.

In this regard, there has been disclosed a method of managing a print job as a hold job when an error has occurred due to paper-out, staple-out of a stapler, ink exhaustion, or the like, and the absence of a supply has been detected for the purpose of making it possible to reprint a print job which has not been printed after the error has been resolved (for example, see Japanese Patent Application Laid-open No. 2004-288032).

However, even in the method disclosed in Japanese Patent Application Laid-open No. 2004-288032, it has been difficult to reflect a change in a condition having influence on printing at the time of retrying a print job in which printing is put on hold. For this reason, when printing has stopped due to an error occurred during printing, the user needed to perform an operation for resolving an error cause such as toner replenishment, and printing has not been difficult to continue automatically. Thus, operability and efficiency have been poor.

Further, there has been already known a forced print technique of designating another tray and forcibly continuing printing when printing has stopped due to an error occurred during printing.

However, in the conventional forced print technique, in order to forcibly print already generated transformation data on a paper being supplied to another tray, for example, when a job of an A3 size transmitted to a printer is printed on an A4 paper, an image gets out of a paper, and an image gets cut off. On the other hand, when a job of an A4 size is printed on an A3 paper, an unnecessary space is left, and thus a print having poor balance is completed. As described above, when printing by the conventional forced print technique is continued, there has been a problem in that visibility of an image is lowered.

SUMMARY OF THE INVENTION

It is an object of the present invention to at least partially solve the problems in the conventional technology.

According to an aspect of this disclosure, there is provided an image forming apparatus including: a storage unit that stores print data and transformation data transformed into a printable format by reflecting a print condition on the print data; a detection unit that detects an error when the transformation data stored in the storage unit is printed; a decision unit that decides a resolution print condition which is a print condition for resolving an error based on a content of the error and a device state when the error is detected; a transformation unit that acquires the print data from the storage unit and transforms the acquired print data into transformation data on which the decided resolution print condition is reflected; and a print control unit that prints the transformation data transformed by the transformation unit.

According to another aspect of this disclosure, there is provided an image forming method performed by an image forming apparatus, the method including: storing, by a storage unit, print data and transformation data transformed into a printable format by reflecting a print condition on the print data in a storage unit; detecting, by a detection unit, an error when the transformation data stored in the storage unit is printed; deciding, by a decision unit, a resolution print condition which is a print condition for resolving an error based on a content of the error and a device state when the error is detected; acquiring, by a transformation unit, the print data from the storage unit and transforming the acquired print data into transformation data on which the decided resolution print condition is reflected; and printing, by a print control unit, the transformation data transformed by the transformation unit.

According to still another aspect of this disclosure, there is provided a computer program product including a non-transitory computer-readable medium having computer-readable program codes, performed by an image forming apparatus, the program codes when executed causing the image forming apparatus to execute: storing, by a storage unit, print data and transformation data transformed into a printable format by reflecting a print condition on the print data in a storage unit; detecting, by a detection unit, an error when the transformation data stored in the storage unit is printed; deciding, by a decision unit, a resolution print condition which is a print condition for resolving an error based on a content of the error and a device state when the error is detected; acquiring, by a transformation unit, the print data from the storage unit and transforming the acquired print data into transformation data on which the decided resolution print condition is reflected; and printing, by a print control unit, the transformation data transformed by the transformation unit.

The aforementioned and other aspects, features, advantages and technical and industrial significance will be better understood by reading the following detailed description, when considered in connection with the accompanying drawings.

BRIEF DESCRIPTION OF THE DRAWINGS

FIG. 9 is a diagram illustrating an example of a limit sheet number table;

DETAILED DESCRIPTION OF THE PREFERRED EMBODIMENTS

Hereinafter, exemplary embodiment of an image forming apparatus, an image forming method, and a computer program product according to the present embodiment will be described in detail with the accompanying drawings.

Figure 1:
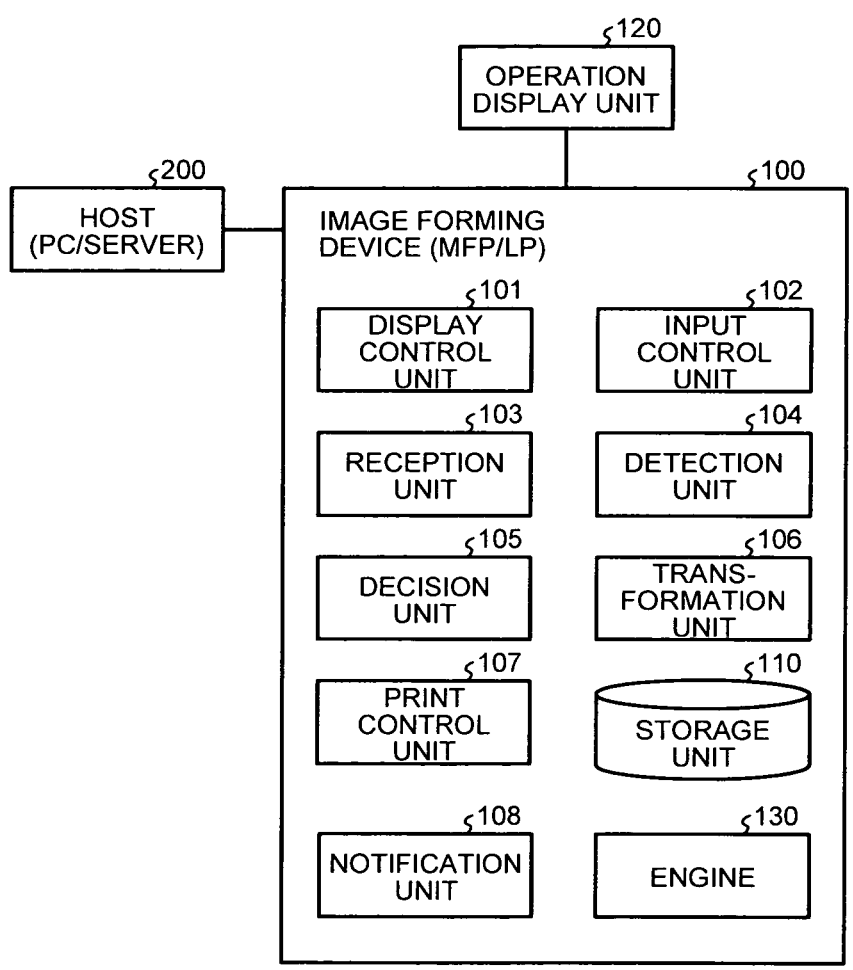
FIG. 1 is a block diagram illustrating a configuration of an image forming system according to the present embodiment.

FIG. 1 is a block diagram illustrating a configuration of an image forming system according to the present embodiment. As illustrated in FIG. 1, the image forming system includes a host 200 which is a personal computer (PC) or a server and an image forming apparatus 100 connected to the host 200 such as a multifunction printer (MFP) or a laser printer (LP).

As illustrated in FIG. 1, the image forming apparatus 100 mainly includes a display control unit 101, an input control unit 102, a reception unit 103, a detection unit 104, a decision unit 105, a transformation unit 106, a print control unit 107, a notification unit 108, an operation display unit 120, a storage unit 110, and an engine 130.

The reception unit 103 receives print data from the host 200 and stores the received print data in the storage unit 110. Here, the print data refers to image data which is a print target, and the image data includes an image or a text.

The display control unit 101 displays various display items on the operation display unit 120. For example, the display control unit 101 displays a print completion notice, an error notice, or warning of a limit sheet number on the operation display unit 120. The warning of the limit sheet number refers to warning for encouraging a user to perform saving setting of a print paper when the number of printed sheets exceeds a predetermined limit sheet number among limit sheet numbers previously set for each user. Also, the limit sheet number refers to the number of sheets capable of printing overall transformation data through saving of a print paper. Further, the saving setting refers to intensive printing or duplex printing.

The input control unit 102 has a function as a change reception unit that receives a change in a print condition when an error is detected by the detection unit 104. The input control unit 102 may receive an input of a change by the user from the operation display unit 120 or may receive a change in a print condition from an information processing device (not shown) connected with the image forming apparatus 100 through a network.

The input control unit 102 has a function as a reception unit that receives selection as to whether or not printing is to stop or whether or not printing is to continue using transformation data on which a condition for resolving an error (hereinafter, referred to as "resolution print condition") is reflected when an error is detected by the detection unit 104. The print condition refers to a condition decided for printing print data and includes a color, intensive printing, the number of copies, duplex printing, and the like.

The detection unit 104 detects an error occurred before or during printing of print data. For example, when a print condition reflected on transformation data is an A3 size but a paper size of a paper tray designated by the user is an A4 size, the detection unit 104 detects a tray selection mistake before print data is printed. Further, when a print condition reflected on transformation data is a color, if color toner exhaustion occurs during printing, the detection unit 104 detects toner exhaustion occurred during printing.

Further, the detection unit 104 detects the resolution of the occurred error. For example, when the user replenishes a toner in response to an error notice of toner exhaust, the detection unit 104 detects toner replenishment as the resolution of an error.

The notification unit 108 displays an error detected by the detection unit 104 on the operation display unit 120 through the display control unit 101. Further, when the limit sheet number is restricted, the notification unit 108 notifies the operation display unit 120 of warning of the limit sheet number through the display control unit 101.

Further, when an error is detected, the decision unit 105 specifies an occurrence location of the error in the image forming apparatus 100 based on the detected error content and decides the resolution print condition based on a device state of the specified occurrence location.

For example, when color toner exhaustion is detected, the decision unit 105 specifies an installation location of a toner tank in the image forming apparatus 100 and decides the resolution print condition based on a state of another toner tank installed in the installation location, that is, a remaining amount of a monochrome toner tank. The decision unit 105 determines whether or not there is a remaining amount in the monochrome toner tank and decides a monochrome as the resolution print condition when it is determined that there is a remaining amount.

Further, when an error of a tray selection mistake of A3 is detected, the decision unit 105 specifies an installation location of the tray in the image forming apparatus 100 and decides the resolution print condition based on the paper size being supplied to another tray arranged in the tray installation location, for example, the presence and absence of an A4 paper.

The transformation unit 106 transforms print data into transformation data by reflecting the resolution print condition decided by the decision unit 105 or the print condition changed by the input control unit 102. For example, the transformation data refers to data transformed into a bitmap data format which is printable format by reflecting the print condition on print data described in a language such as a page description language.

For example, the transformation unit 106 transforms print data described in a PDL which is one of page description languages (hereinafter, referred to as "pre-RIP data") into transformation data rendered in a bitmap format (hereinafter, referred to as "post-RIP data") through the RIP and stores the transformation data in the storage unit 110.

Figure 2:
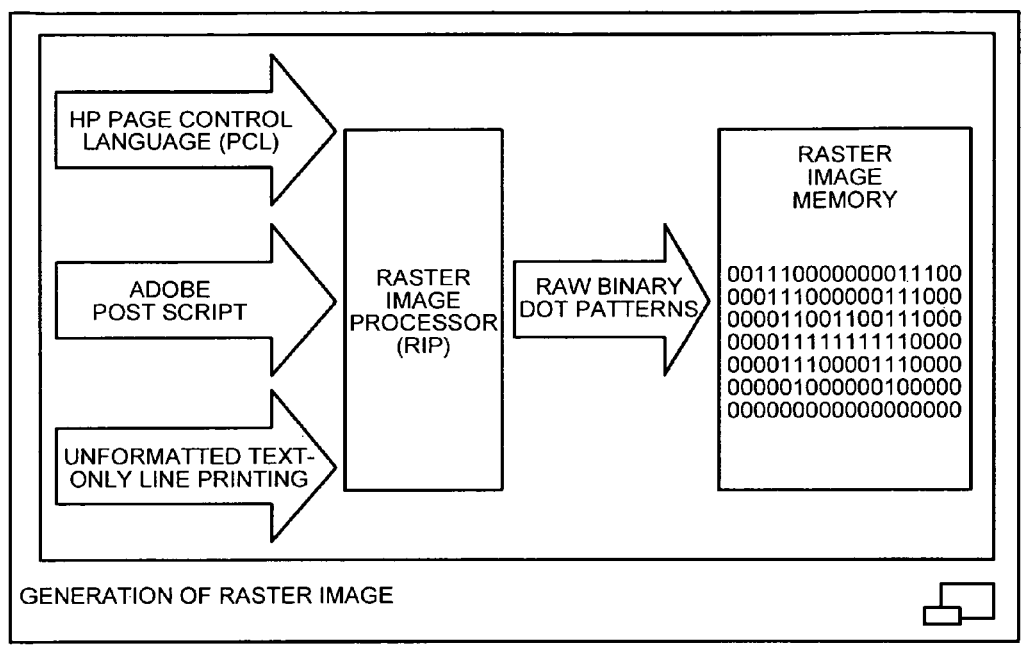
FIG. 2 is an image diagram in which a transformation unit transforms pre-RIP data into post-RIP data.

FIG. 2 is an image diagram in which the transformation unit 106 transforms pre-RIP data into post-RIP data. Referring to FIG. 2, the transformation unit 106 subjects print data, which is generated in a format such as printer control language (PCL) which is one of page description languages or Adobe (a registered trademark) which is one of image formats as indicated by three arrows on the left side, to RIP as illustrated in the center of FIG. 2. As illustrated in the right side of FIG. 2, the transformation unit 106 transforms the pre-RIP data through the RIP and generates a raster image (a bitmap image). PCL, Adobe (a registered trademark), and the like are exemplary, and all languages or formats capable of generating print data may be used.

Further, even when post-RIP data is present in the storage unit 110, if the resolution print condition is decided by the decision unit 105, the transformation unit 106 transforms the pre-RIP data into re-RIP data in which the print condition decided by the decision unit 105 is reflected again. The re-RIP data refers to post-RIP data since the pre-RIP data is the transformed data, but if particularly set forth herein, when post-RIP data is already present, transformation data transformed from the pre-RIP data again is referred to as the re-RIP, data.

The storage unit 110 stores various pieces of information. For example, the storage unit 110 stores print data received from the reception unit 103 or pre-RIP data scanned by a scanner (not shown). Further, the storage unit 110 stores post-RIP data transformed by the transformation unit 106.

Figure 3:
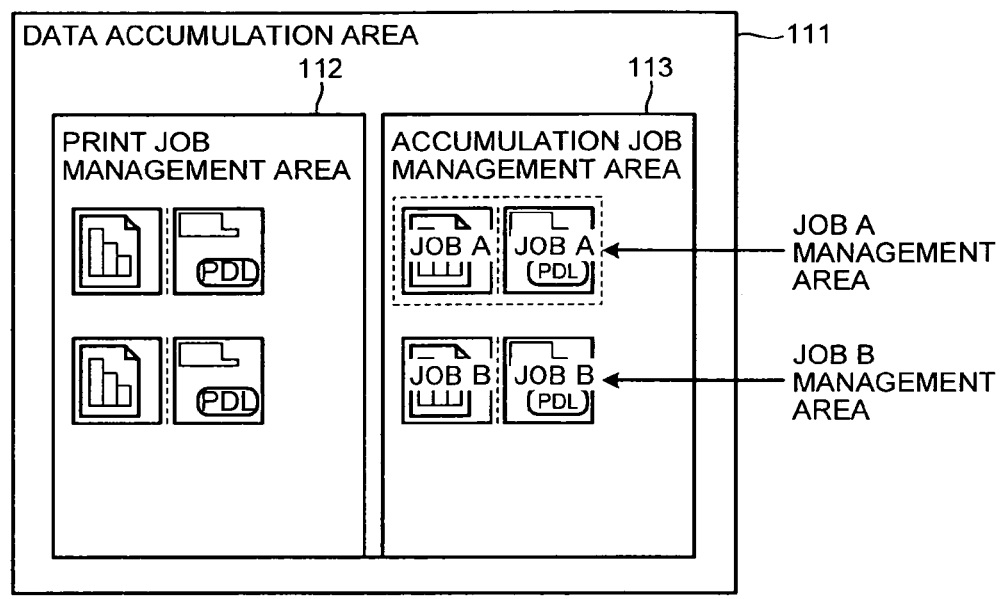
FIG. 3 is a diagram illustrating an example of the details of a storage area of a storage unit according to the present embodiment.

FIG. 3 is a diagram illustrating an example of the details of a storage area of the storage unit 110 according to the present embodiment. As illustrated in FIG. 3, the storage unit 110 allocates a part of a storage area to a data accumulation area 111. Here, as illustrated in FIG. 3, the data accumulation area includes a print job management area 112 and an accumulation job management area 113, and the pre-RIP data and the post-RIP data are accumulated in the data accumulation area.

The print job management area 112 manages non-printed post-RIP data in association with the pre-RIP data. The accumulation job management area 113 stores printed post-RIP data in association with the pre-RIP data as an accumulation job which is a reprinting target. The accumulation job management area 113 of FIG. 3 is divided into a job A management area and a job B management area as indicated by arrows. Further, in the job A management area surrounded by a dotted line, post-RIP data, inside the dotted line, illustrated on the left side is disposed together with pre-RIP data illustrated on the right side.

Figure 4:
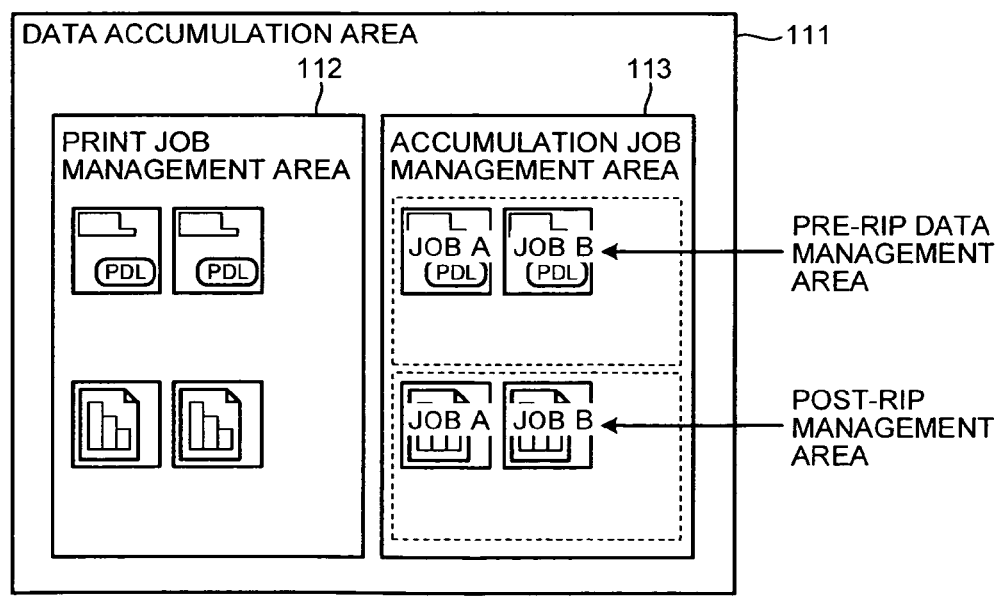
FIG. 4 is a diagram illustrating an example of the details of a storage area of a conventional storage unit.

FIG. 4 is a diagram illustrating an example of the details of a storage area of a conventional storage unit. As illustrated in FIG. 4, in the conventional storage unit, both a print job management area and an accumulation management area individually store post-RIP data and pre-RIP data. For example, in the accumulation job management area, a pre-RIP job management area and a post-RIP job management area are surrounded by a dotted line, respectively. That is, the conventional storage unit has not stored post-RIP data in association with pre-RIP data.

Further, the storage unit 110 stores an permission print condition and the like. The storage unit 110 stores the print condition corresponding to the permission print condition. For example, the storage unit 110 stores a monochrome as a color mode that can be used when a use of a monochrome is allowed in association with the permission print condition. Further, when a use of color is allowed, the storage unit 110 stores a monochrome and a color in association with each other as an available color mode.

Further, the storage unit 110 stores a limit sheet number table. Here, the limit sheet number table refers to a table in which the details of the limit sheet number set for each user which will be described later are registered. For example, the details will be described later, the limit sheet number table stores the limit sheet number in association with the number of printed sheets for each user.

The print control unit 107 acquires the pre-RIP data or the post RIP data transformed by the transformation unit 106 from the storage unit 110 and transmits the acquired post-RIP data to the engine 130 so that the post-RIP data can be printed. Further, when the detection unit 104 detects the resolution of an error, the print control unit 107 prints the post-RIP data. For example, when the detection unit 104 detects toner replenishment or a change in the print condition as the resolution of an error, the print control unit 107 prints the post-RIP data.

The engine 130 receives the transformation data from the print control unit 107, prints the received transformation data, and discharges the printed paper.

Figure 5:
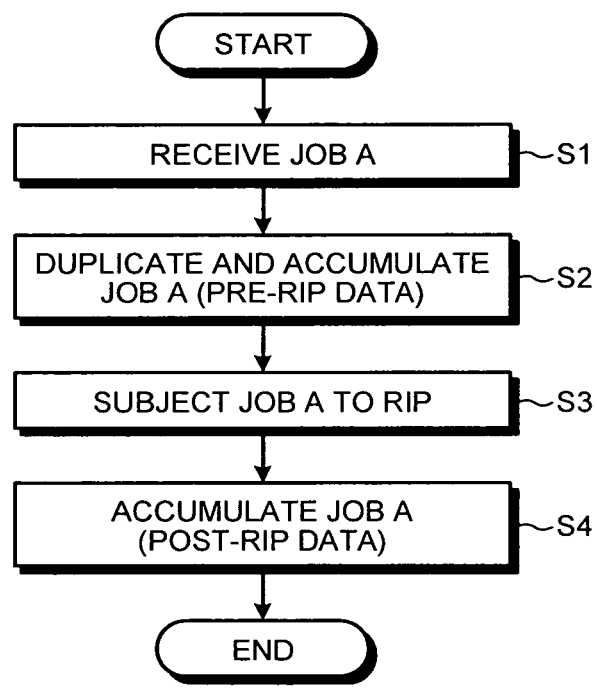
FIG. 5 is a flowchart illustrating a procedure of a printing process by an image forming apparatus.

Next, a description will be made in connection with a procedure of a printing process by the image forming apparatus 100 having the above described configuration. FIG. 5 is a flowchart illustrating a procedure of a printing process by the image forming apparatus 100.

In step S1, the reception unit 103 receives pre-RIP data of a job A. In step S2, the reception unit 103 duplicates the job A and accumulates the duplicated pre-RIP data in the job A management area of the accumulation job management area 113 of the storage unit 110.

In step S3, the transformation unit 106 transforms the pre-RIP data of the job A into post-RIP data. In step S4, the print control unit 107 prints the post-RIP data transformed by the transformation unit 106 on a paper through the engine 130 and discharges the printed paper.

In step S5, the transformation unit 106 accumulates the post-RIP data in the job A management area of accumulation job management area 113 of the storage unit 110.

Figure 6:
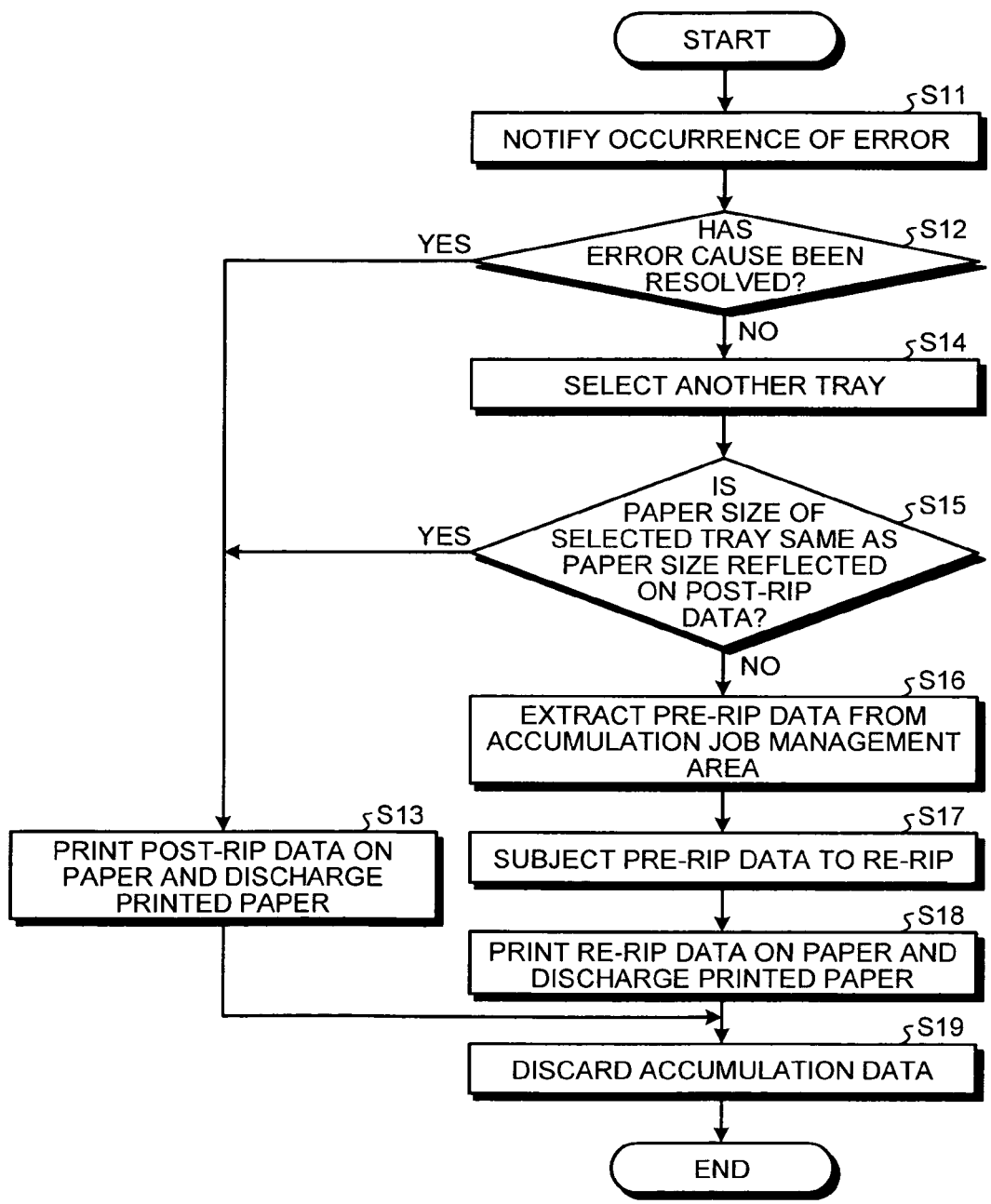
FIG. 6 is a flowchart illustrating a procedure of a printing process by an image forming apparatus.

Next, a description will be made in connection with a procedure of a printing process by the image forming apparatus 100 when an error occurs during printing. FIG. 6 is a flowchart illustrating a procedure of a printing process by the image forming apparatus 100 when an error occurs during printing. Here, a description will be made in connection with a case in which an error occurred during printing is paper-out or a tray selection mistake.

The detection unit 104 detects the paper-out or the tray selection mistake as an error. In step S11, the detection unit 104 notifies the display control unit 101 of the occurrence of the error.

In step S12, the print control unit 107 determines whether or not the release of an error cause has been detected by the detection unit 104. When it is determined that the release of an error cause has been detected by the detection unit 104 (Yes in step S12), in step S13, the print control unit 107 prints the post-RIP data on the paper through the engine 130 and discharges the printed paper. In step S19, the print control unit 107 discards the accumulation data from the accumulation job management area 113 of the storage unit 110.

However, when it is determined that the release of an error cause has not been detected by the detection unit 104 (No in step S12), in step S14, the print control unit 107 causes the decision unit 105 to select another tray.

In step S15, the print control unit 107 determines whether or not the paper size of the tray selected by the decision unit 105 is the same as the paper size reflected on the post-RIP data. When it is determined that the paper size of the tray selected by the decision unit 105 is the same as the paper size reflected on the post-RIP data (Yes in step S15), the print control unit 107 performs processing of step S13 and step S19.

Meanwhile, when the print control unit 107 determines that the paper size of the tray selected by the decision unit 105 is not the same as the paper size reflected on the post-RIP data (No in step S15), in step S16, the transformation unit 106 extracts the pre-RIP data from the accumulation job management area 113 of the storage unit 110.

Here, when the paper size being supplied to the selected tray is different from the paper size included in the print condition reflected on the post-RIP data, the decision unit 105 decides a value for reducing or enlarging the pre-RIP data to the size of the paper supplied to the selected tray as the resolution print condition. For example, when the paper size of the selected tray is A3 and the print condition reflected on the post-RIP data is A4, a condition for enlarging the A4 size to the A3 size is decided as the resolution print condition.

On the other hand, when the paper size of the selected tray is A4 and the print condition reflected on the post-RIP data is A3, the decision unit 105 decides a condition for reducing the A3 size to the A4 size as the resolution print condition.

Here, when the input control unit 102 receives a change in the print condition from the user, the decision unit 105 decides the print condition changed by the user as the resolution print condition. At this time, the detection unit 104 may further determine and detect whether or not the print condition changed by the user is not an error.

In step S17, the transformation unit 106 subjects the extracted pre-RIP data to re-RIP. For example, when the resolution print condition decided by the decision unit 105 is the condition for enlarging the A4 size to the A3 size, the transformation unit 106 transforms the pre-RIP data into re-RIP data on which the A3 size is reflected.

In step S18, the print control unit 107 prints the re-RIP data on a paper through the engine 130 and discharges the printed paper. Subsequently, the print control unit 107 performs processing of step S19.

Figure 7:
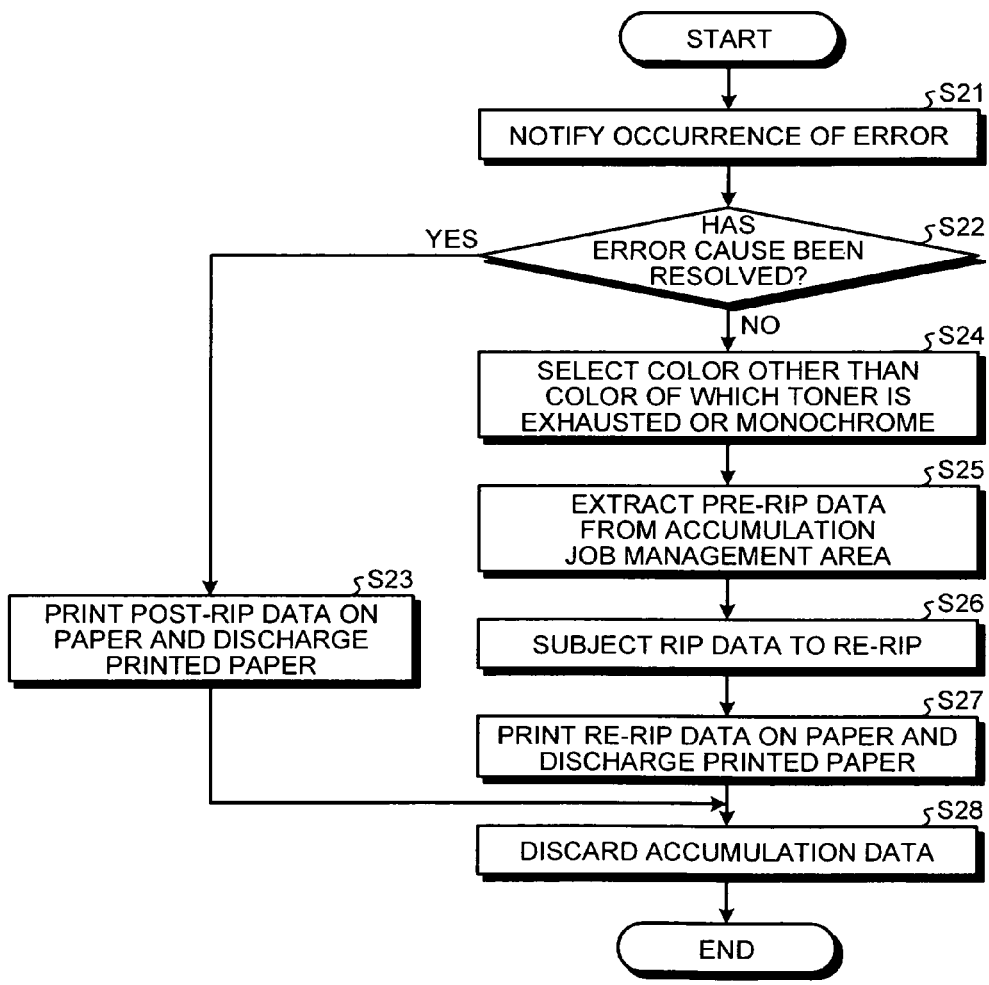
FIG. 7 is a flowchart illustrating a procedure of a printing process by an image forming apparatus according to another example 1.

Next, a description will be made in connection with a procedure of a printing process by the image forming apparatus 100 when an error occurs during printing according to three different examples (another example 1, another example 2, and another example 3). FIG. 7 is a flowchart illustrating a procedure of a printing process by the image forming apparatus 100 when an error occurs during printing according to another example 1. Here, for example, a description will be made in connection with a case in which an error occurred during printing is cyan toner exhaustion.

The detection unit 104 detects cyan toner exhaustion as an error. Further, processing of from step S21 to step S23 is the same as processing of from step S11 to step S13 of the printing process of FIG. 6.

When it is determined in step S22 that the release of an error cause has not been detected by the detection unit 104 (No in step S22), in step S24, the decision unit 105 selects a color other than a color of which a toner has been exhausted or a monochrome. Here, for example, the decision unit 105 decides a color other than a color (cyan) of which a toner has been exhausted, or a monochrome as the resolution print condition.

For example, when the print condition reflected on the post-RIP data is a color and the device state represents that a toner of a color other than cyan remains in the toner tank, the decision unit 105 decides color printing by a color other than cyan as the resolution print condition. Further, when the device state represents that a toner of a color other than cyan does not remain in the toner tank but a black toner remains, the decision unit 105 decides monochrome printing as the resolution print condition.

At this time, when the decision unit 105 decides a color other than a color (cyan) of which a toner has been exhausted as the resolution print condition, the print control unit 107 appropriately performs color adjustment using a toner of a color other than a color (cyan) of which a toner has been exhausted so that the coloration can be natural; and then performs printing.

Further, processing of from step S25 to step S28 is the same as processing of from step S16 to step S19 of the printing process of FIG. 6.

Figure 8:
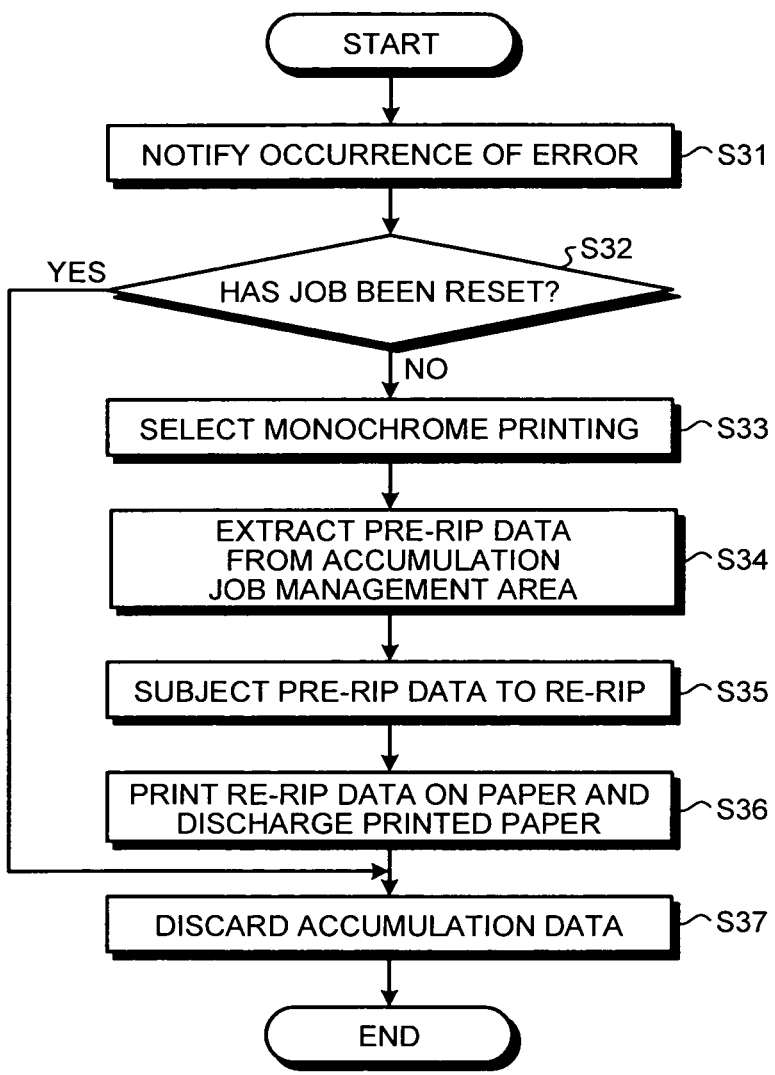
FIG. 8 is a flowchart illustrating a procedure of a printing process by an image forming apparatus according to another example 2.

Next, a description will be made in connection with a procedure of a printing process by the image forming apparatus 100 when an error occurs during printing according to another example 2. FIG. 8 is a flowchart illustrating a procedure of a printing process by the image forming apparatus 100 when an error occurs during printing according to another example 2.

Here, a description will be made in connection with a case in which a print condition that does not satisfying the permission print condition occurs during printing as an error. Specifically, a description will be made in connection with a case in which the print condition is switched to color printing since a color page is present in post-RIP data during printing of the post-RIP data by the user who is allowed to perform only monochrome printing.

The detection unit 104 detects switching to a print condition (color printing) that is not included in the permission print condition as an error. Further, processing of from step S31 is the same as processing of from step S11 the printing process of FIG. 6.

In step S32, the decision unit 105 determines whether or not a job has been reset. When the decision unit 105 determines that the job has been reset (Yes in step S32), in step S37, the print control unit 107 discards the accumulation data from the accumulation job management area of the storage unit 110. Here, the print control unit 107 discards a page subsequent to a page in which an error has been detected, cancels the job, and finishes the process.

However, when it is determined that the job has not been reset (No in step S32), in step S33, the decision unit 105 selects monochrome printing. Here, the decision unit 105 decides monochrome printing as the resolution print condition.

Processing from step S34 to step S37 is the same as processing from step S16 to step S19 of the printing process of FIG. 6.

Next, a description will be made in connection with a printing process by the image forming apparatus 100 when an error occurs during printing according to another example 3. Here, a description will be made in connection with a case in which excess of a warning threshold value registered in a limit sheet number table during printing is detected as an error.

First, the limit sheet number table will be described. FIG. 9 is a diagram illustrating an example of the limit sheet number table. The storage unit 110 stores the limit sheet number table as illustrated in FIG. 9.

Referring to FIG. 9, a user name is associated with color authority, a limit sheet number per month, a warning threshold value, and the number of printed sheets. Here, the color authority represents the type of color (color or monochrome)

in which a use of color is allowed among the user's permission print conditions. The number of printable sheets per month represents the number of papers printable for one month.

Further, the warning threshold value is set to warn the user about the fact that a small number of sheets remains until the limit sheet number is reached when the number of printed sheets exceeds a predetermined threshold value. For example, when a difference between the limit sheet number per month and the number of printed sheets reaches a predetermined sheet number, the warning threshold value is set based on a value capable of printing the number of remaining prints number by switching to saving setting.

For example, as for a user name "Yamada" of FIG. 9, the color authority is "full color", and the number of printable sheets per month is "1000". Further, the warning threshold value is "80% of the number of printable sheets", that is, 800 sheets, and the number of printed sheets is "586".

Here, the number of sheets obtained by subtracting the number of printed sheets from the threshold value (800 sheets) of the limit sheet number is 214 sheets, and so at a point in time when 214 sheets are printed, the notification unit 108 notifies warning of the limit sheet number.

Figure 10:
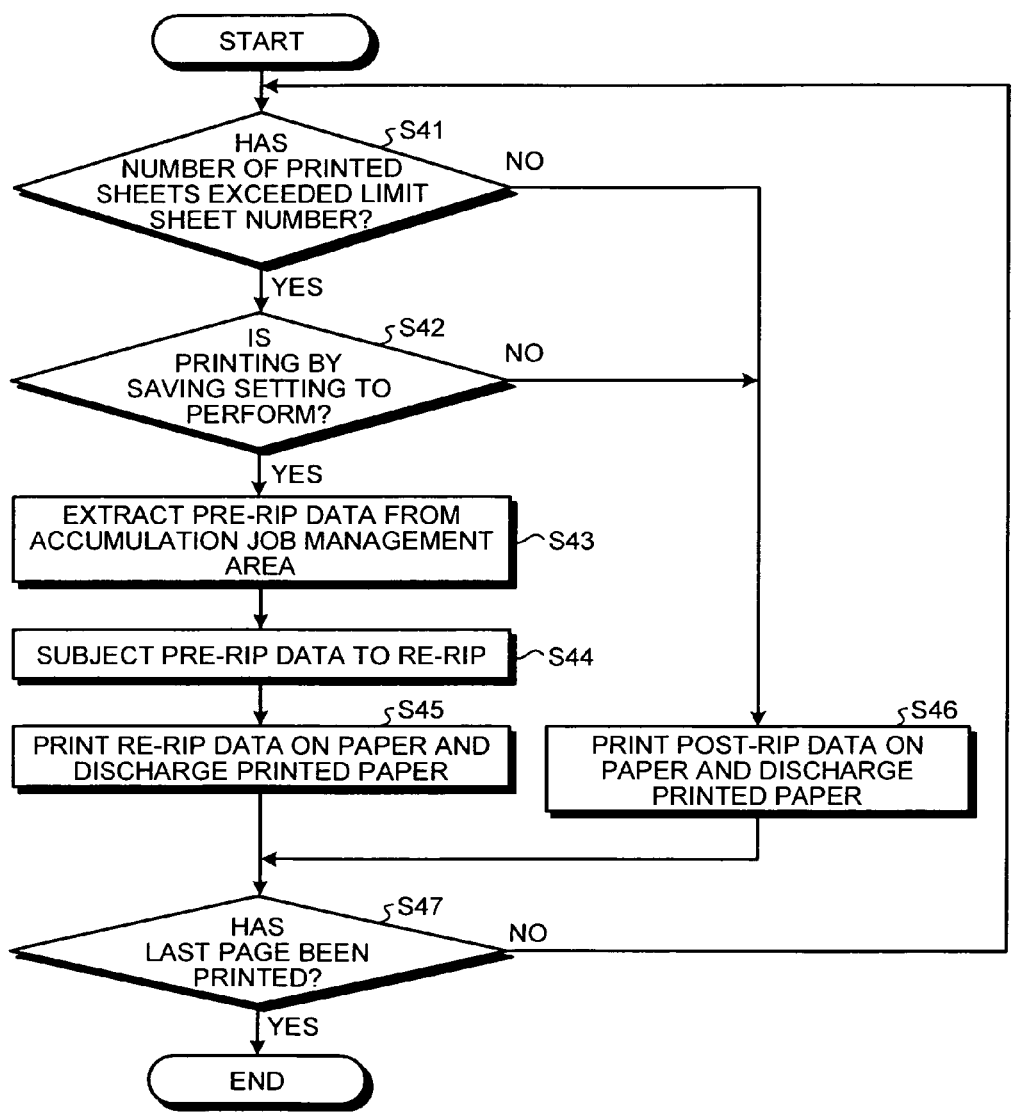
FIG. 10 is a flowchart illustrating a procedure of a printing process by an image forming apparatus according to another example 3.

Next, a description will be made in connection with a procedure of a printing process by the image forming apparatus 100 when an error occurs during printing according to another example 3. FIG. 10 is a flowchart illustrating a procedure of a printing process by the image forming apparatus 100 when an error occurs during printing according to another example 3.

Here, a description will be made in connection with a case in which excess of the warning threshold value registered in the limit sheet number table during printing occurs as an error.

In step S41, the detection unit 104 determines whether or not the number of printed sheets by the user registered in the limit sheet number table exceeds the warning threshold value. When the detection unit 104 determines that the number of printed sheets by the user registered in the limit sheet number table has exceeded the warning threshold value (Yes in step S41), in step S42, the decision unit 105 decides whether or not printing by saving setting is to perform.

The decision unit 105 may decide the details of specific saving setting based on the limit sheet number registered in the limit sheet number table, the number of printed sheets, and the number of remaining prints of post-RIP data which is being printed or may decide the details of saving setting based on the presence and absence of saving setting received from the user. For example, the decision unit 105 may decide intensive printing in which the number of print pages per sheet is two pages, duplex printing, or setting in which intensive printing and duplex printing are combined as the resolution print condition based on the limit sheet number, the number of printed sheets, and the number of remaining prints of the post-RIP data which is being printed.

Further, the decision unit 105 may receive saving setting from the user through the input control unit 102 with respect to warning of the limit sheet number and decide the received content as the resolution print condition. Here, the decision unit 105 displays a setting screen of saving setting on the operation display unit 120 through the display control unit 101 but may not display the setting screen again after setting is once made by the user. At this time, the detection unit 104 may determine whether or not the remainder of the post-RIP data which is being printed is all printable by saving setting received from the user.

When the decision unit 105 decides that printing with saving setting is to perform (Yes in step S42), the print control unit 107 shifts to processing of step S43. Further, processing from step S43 to step S45 is the same as processing of step S16 to step S18 of the flowchart representing the procedure of the printing process of FIG. 6. After step S45, the process proceeds to step S47.

Meanwhile, when the detection unit 104 determines that the number of printed sheets does not exceed the warning threshold value in step S41 (No in step S41) or when the decision unit 105 decides that printing by saving setting is difficult to perform in step S42 (No in step S42), in step S46, the print control unit 107 prints the post-RIP data on the paper through the engine 130 and discharges the printed paper.

Further, when the decision unit 105 decides that printing by saving setting is difficult to perform in step S42 (No in step S42), remaining data of the post-RIP data which is being printed is printed by the remaining limit sheet number of pages.

In step S47, the detection unit 104 determines whether or not printing of a last page has been finished. When the detection unit 104 determines that printing of a last page has not been finished (No in step S47), the process returns to step S41, and processing from step S41 to step S47 is repeated. This judgment is performed for each page.

However, when the detection unit 104 determines that printing of a last page has been finished (Yes in step S47), the process is finished.

As described above, according to the present embodiment, even when an error occurs during printing, the decision unit 105 decides the print condition that can resolve the error as the resolution print condition, and so remaining transformation data which is being printed is printed under the resolution print condition. Thus, even when an error occurs during printing, printing can be continued without lowering operability of the printing process and visibility of an image.

Figure 11:
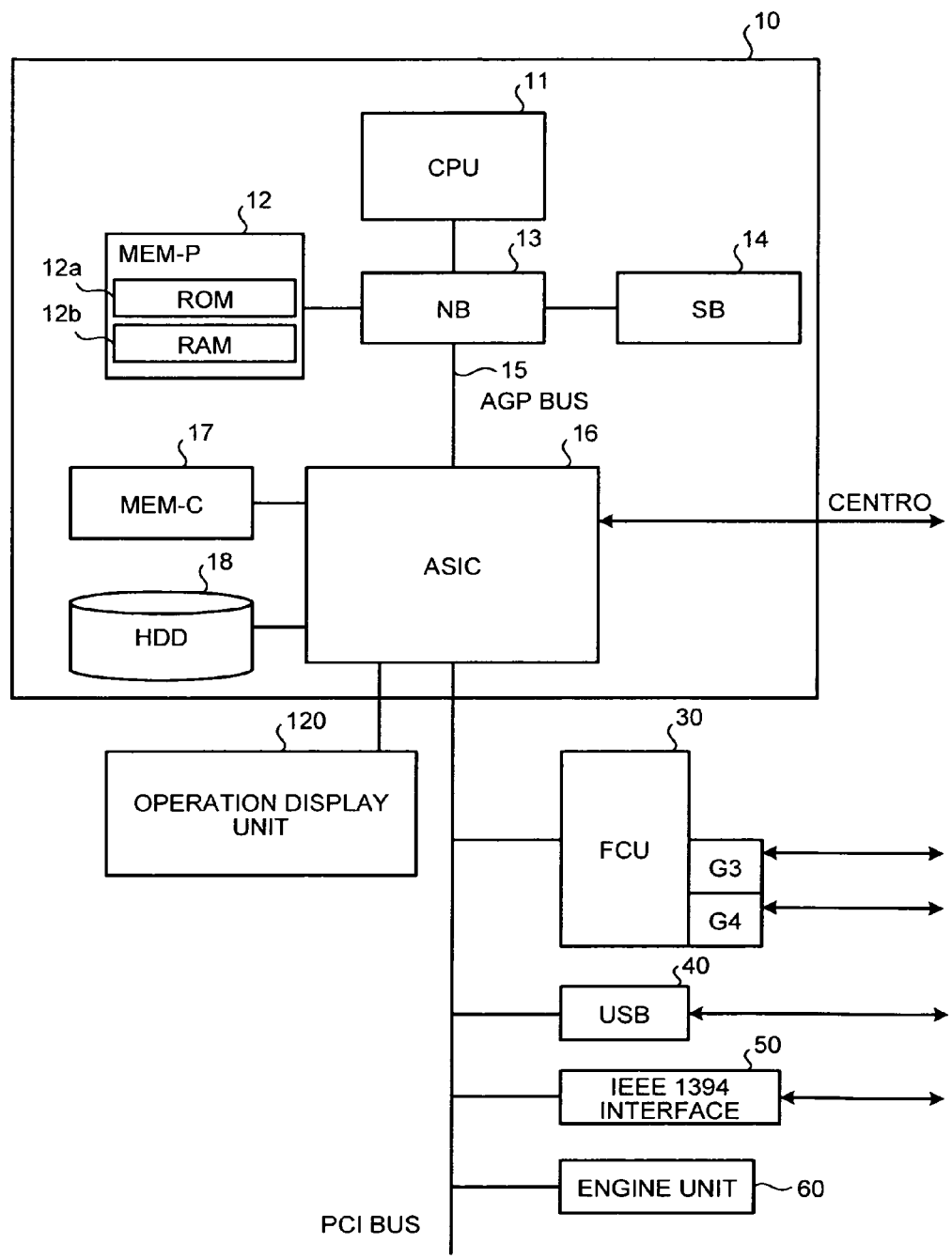
FIG. 11 is a block diagram illustrating a hardware configuration of an image forming apparatus.

FIG. 11 is a block diagram illustrating a hardware configuration of the image forming apparatus 100 according to the present embodiment. In FIG. 11, an MFP is described as an example of the image forming apparatus 100. The image forming apparatus 100 is configured such that a controller 10 is connected with an engine unit 60 through a peripheral component interface (PCI) bus. The controller 10 refers to a controller that controls overall control and rendering of the image forming apparatus 100, communication, and an input from an operation unit (not shown). For example, the engine unit 60 is a printer engine connectable to the PCI bus and includes a monochrome plotter, a single drum color plotter, a four-drum color plotter, a scanner, a facsimile unit, or the like. The engine unit 60 includes an image processing unit that performs error diffusion, gamma transformation, or the like in addition to the engine unit such as the plotter.

The controller 10 includes a central processing unit (CPU) 11, a northbridge (NB) 13, a system memory (MEM-P) 12, a southbridge (SB) 14, a local memory (MEM-C) 17, an application-specific integrated circuit (ASIC) 16, and a hard disk drive (HDD) 18. An accelerated graphics port (AGP) bus 15 connects the NB 13 and the ASIC 16. The MEM-P 12 further includes a read-only memory (ROM) 12a and a random access memory (RAM) 12b.

The CPU 11 controls the entire image forming apparatus 100 and includes a chipset configured with the NB 13, the MEM-P 12, and the SB 14. The CPU 11 is connected to other devices through the chipset.

The NB 13 is a bridge that connects the CPU 11 with the MEM-P 12, the SB 14, and the AGP bus 15. The NB 13 includes a memory controller that controls reading and writing on the MEM-P 12, a PCI master, and an AGP target.

The MEM-P 12 is a system memory which is used as a memory for storing a program or data, a memory for developing a program or data, or a memory for rendering of a printer. The MEM-P 12 includes the ROM 12*a* and the RAM 12*b*. The ROM 12*a* is a read-only memory used as a memory for storing a program or data. The RAM 12*b* is a readable/writable memory used as a memory for developing a program or data or a memory for rendering of a printer.

The SB 14 is a bridge that connects the NB 13 with a PCI device or a peripheral device. The SB 14 is connected with the NB 13 through the PCI bus. A network interface (I/F) unit or the like is also connected to the PCI bus.

The ASIC 16 is an integrated circuit (IC) for image processing that includes hardware elements for image processing; and plays a role of a bridge that connects the AGP bus 15, the PCI bus, the HDD 18, and the MEM-C 17 with one another. The ASIC 16 includes the PCI master, the AGP target, an arbiter (ARB) that forms the core of the ASIC 16, a memory controller that controls the MEM-C 17, a plurality of direct memory access controllers (DMAC) that performs rotation of image data by hardware logic or the like, and a PCI unit that transmits data to the engine unit 60 through the PCI bus. A facsimile control unit (FCU) 30, a universal serial bus (USB) 40, and an institute of electrical and electronics Engineers (IEEE) 1394 interface 50 are connected to the ASIC 16 through the PCI bus. The operation display unit 120 is directly connected to the ASIC 16.

The MEM-C 17 is a local memory used as an image buffer for copying or a code buffer. The HDD 18 is a storage for performing accumulation of image data, accumulation of a program, accumulation of font data, or accumulation of a form.

The AGP bus 15 is a bus interface for a graphic accelerator card for increasing the speed of graphic processing. The AGP bus 15 increases the speed of the graphic accelerator card by directly accessing the MEM-P 12 at a high throughput.

Further, an image forming program executed by the image forming apparatus of the present embodiment is provided in a form previously embedded in a ROM or the like.

An image forming program executed by the image forming apparatus of the present embodiment may be a file having an installable format or an executable format; and may be configured to be provided in a form recorded on a computer readable recording medium such as a compact disc read only memory (CD-ROM), a flexible disk (FD), a compact disc recordable (CD-R), and a digital versatile disk (DVD).

In addition, an image forming program executed by the image forming apparatus of the present embodiment may be configured to be stored in a computer connected to a network such as the Internet and provided by downloading through the network. An image forming program executed by the image forming apparatus of the present embodiment may be configured to be provided or distributed through a network such as the Internet.

An image forming program executed by the image forming apparatus of the present embodiment may have a module configuration including the above described components (the display control unit, the input control unit, the reception unit, the detection unit, decision unit, the transformation unit, the print control unit, and the notification unit). In actual hardware, by reading out and executing the image forming program from the ROM through a CPU (a processor), the above described components are loaded onto a main storage device, so that the display control unit, the input control unit, the reception unit, the detection unit, decision unit, the transformation unit, the print control unit, and the notification unit are generated on the main storage device.

The above embodiment has been described in connection with the example in which the image forming apparatus of the present invention is applied to an MFP having at least two functions of a copying function, a printer function, a scanner function, and a facsimile function; but the present invention can be applied to any image forming apparatus such as a copying machine, a printer, a scanner device, and a facsimile device.

According to the present embodiment, there is an effect capable of continuing printing without lowering operability of a printing process and visibility of an image even when an error occurs during of printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
    a storage unit that stores print data and transformation data transformed into a printable format by reflecting a print condition on the print data, the print data being in association with the transformation data in the storage unit;
    a detection unit that detects an error on paper when the transformation data stored in the storage unit is printed;
    a decision unit that decides a change of paper size as a resolution print condition which is a print condition for resolving an error based on a content of the error and a device state when the error is detected;
    a transformation unit that acquires the print data being in association with the transformation data in which the error is detected by the detection unit from the storage unit and transforms the acquired print data into another transformation data on which the decided resolution print condition is reflected; and
    a print control unit that prints another transformation data transformed by the transformation unit.

2. The image forming apparatus according to claim 1, wherein the storage unit further stores a permission print condition of which a use is permitted to a user,
    the detection unit determines whether or not the print condition is included in the permission print condition and determines the print condition as an error when it is determined that the print condition is not included in the permission print condition, and
    the decision unit decides the permission print condition as the resolution print condition.

3. The image forming apparatus according to claim 2, wherein the permission print condition is monochrome printing, and the print condition is color printing.

4. The image forming apparatus according to claim 1, further comprising a change reception unit that receives an input of a change in the print condition when an error is detected,
    wherein the decision unit decides the print condition of which the input of the change has been received as the resolution print condition.

5. The image forming apparatus according to claim 1, further comprising a selection reception unit that receives selection as to whether printing is to stop or printing is to continue using transformation data on which the resolution print condition is reflected when an error is detected,
    wherein the decision unit decides the resolution print condition when selection for continuing printing using the transformation data on which the resolution print condition is reflected is received.

6. The image forming apparatus according to claim 1,
wherein the storage unit further stores a limit sheet number representing the number of prints of which a use is permitted to the user within a predetermined time period,
  the detection unit detects an error when a difference between the limit sheet number and the number of printed sheets exceeds a threshold value decided as the number of sheets capable of printing overall transformation data by saving of a print sheet, and
  the decision unit decides a print condition under which the number of arranged pages per print sheet is increased based on the number of printed sheets and the threshold value when the number of printed sheets exceeds the threshold value.

7. The image forming apparatus according to claim 6,
wherein the saving is intensive printing or duplex printing.

8. The image forming apparatus according to claim 1,
wherein the error on paper is paper-out or a tray selection mistake.

9. An image forming method performed by an image forming apparatus, the method comprising:
  storing, by a storage unit, print data and transformation data transformed into a printable format by reflecting a print condition on the print data in a storage unit, the print data being in association with the transformation data in the storage unit;
  detecting, by a detection unit, an error on paper when the transformation data stored in the storage unit is printed;
  deciding, by a decision unit, a change of paper size as a resolution print condition which is a print condition for resolving an error based on a content of the error and a device state when the error is detected;
  acquiring, by a transformation unit, the print data being in association with the transformation data in which the error is detected by the detection unit from the storage unit and transforming the acquired print data into another transformation data on which the decided resolution print condition is reflected; and
  printing, by a print control unit, another transformation data transformed by the transformation unit.

10. A computer program product comprising a non-transitory computer-readable medium having computer-readable program codes, performed by an image forming apparatus, the program codes when executed causing the image forming apparatus to execute:
  storing, by a storage unit, print data and transformation data transformed into a printable format by reflecting a print condition on the print data in a storage unit, the print data being in association with the transformation data in the storage unit;
  detecting, by a detection unit, on paper an error when the transformation data stored in the storage unit is printed;
  deciding, by a decision unit, a change of paper size as a resolution print condition which is a print condition for resolving an error based on a content of the error and a device state when the error is detected;
  acquiring, by a transformation unit, the print data being in association with the transformation data in which the error is detected by the detection unit from the storage unit and transforming the acquired print data into another transformation data on which the decided resolution print condition is reflected; and
  printing, by a print control unit, another transformation data transformed by the transformation unit.

* * * * *